(12) United States Patent
Messler

(10) Patent No.: US 8,528,311 B1
(45) Date of Patent: Sep. 10, 2013

(54) CONDUIT LINK SYSTEM

(71) Applicant: Todd A. Messler, Nanuet, NY (US)

(72) Inventor: Todd A. Messler, Nanuet, NY (US)

( * ) Notice: Subject to any disclaimer, the term of this patent is extended or adjusted under 35 U.S.C. 154(b) by 0 days.

(21) Appl. No.: 13/628,397

(22) Filed: Sep. 27, 2012

(51) Int. Cl.
*F16G 13/16* (2006.01)

(52) U.S. Cl.
USPC ............................ 59/78.1; 59/93; 248/317

(58) Field of Classification Search
USPC .................. 59/78.1, 93; 174/70 R; 200/298; 362/408; 248/317
See application file for complete search history.

(56) References Cited

U.S. PATENT DOCUMENTS

| | | | | |
|---|---|---|---|---|
| 785,873 | A * | 3/1905 | Goldman | 59/78.1 |
| 966,626 | A * | 8/1910 | Ummach | 248/317 |
| 1,047,568 | A * | 12/1912 | Riess | 59/78.1 |
| 1,091,255 | A * | 3/1914 | Taylor | 59/78.1 |
| 1,098,779 | A * | 6/1914 | Blake | 59/78.1 |
| 1,233,538 | A * | 7/1917 | Alden | 59/78.1 |
| 1,394,575 | A * | 10/1921 | Park | 59/78.1 |
| 1,438,344 | A * | 12/1922 | Sweet | 439/24 |
| 1,550,683 | A * | 8/1925 | Erikson | 59/78.1 |
| 1,925,716 | A | 9/1933 | D'Olier, Jr. | |
| 3,188,794 | A * | 6/1965 | Johnson | 59/78.1 |
| 3,281,564 | A | 10/1966 | Maxted | |
| 3,300,635 | A | 1/1967 | Ramsey, Jr. | |
| 3,735,329 | A | 5/1973 | Funabashi et al. | |
| 3,813,478 | A * | 5/1974 | Ervin | 174/70 R |
| 3,897,993 | A | 8/1975 | Fleischhacker et al. | |
| 4,214,805 | A | 7/1980 | Faulconer | |
| 4,270,830 | A | 6/1981 | Brenner | |
| 4,655,531 | A | 4/1987 | Delaney | |
| 4,810,207 | A | 3/1989 | Butterfield | |
| 5,385,482 | A | 1/1995 | Rottner | |
| 6,854,867 | B2 | 2/2005 | Mas Quiles | |
| 6,883,300 | B2 * | 4/2005 | Sanders | 59/78.1 |

* cited by examiner

*Primary Examiner* — David B Jones
(74) *Attorney, Agent, or Firm* — Jason L. Gilbert

(57) ABSTRACT

A conduit link system for concealing conduit linking a power source in a ceiling to a suspended load such as a chandelier. The conduit link system generally includes an upper link member for mounting to a ceiling and electrically connecting to a power source. A first central link member will generally be interlocked and electrically connected to the upper link member. Additional central link members may be interlocked and electrically connected with the first central link member and other central link members depending on the distance from the power source to the load. A lower link member is linked and electrically connected to the lowest central link member. The lower link member may then be mounted to a load such as a chandelier. The electrical conduit is fully concealed within the housing of the link members, thus allowing the load to be suspended without the presence unsightly wires.

9 Claims, 16 Drawing Sheets

CONDUIT LINK SYSTEM

CROSS-REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a system for linking conduit and more specifically it relates to a conduit link system for concealing conduit linking a power source in a ceiling to a suspended load such as a chandelier.

2. Description of the Related Art

Any discussion of the related art throughout the specification should in no way be considered as an admission that such related art is widely known or forms part of common general knowledge in the field.

Suspended loads such as chandeliers have been in use for years. Typically, when installing a chandelier or other suspended load, electrical conduit such as wiring is wound through the chain or other structure which acts to suspend the load from a ceiling. The use of such wound wire can be extremely distracting and act to diminish the aesthetic value of the piece being suspended. This problem can become particularly troublesome when the aesthetics of an expensive chandelier in a foyer is comprised by such tangled, unsightly wires.

Further, when installing chandeliers or other hanging power loads such as lamps, projectors and the like, it is often difficult and time-consuming to painstakingly wind electrical conduit through the chain links to connect the power source to the load. As the chandelier or other device moves around, the wiring can become tangled and/or severed, thus requiring maintenance or replacement.

Because of the inherent problems with the related art, there is a need for a new and improved conduit link system for suspending a load such as a chandelier utilizing concealed conduits to avoid unsightly wires.

BRIEF SUMMARY OF THE INVENTION

A system concealing conduit linking a power source in a ceiling to a suspended load such as a chandelier. The invention generally relates to a conduit link system which includes an upper link member for mounting to a ceiling and electrically connecting to a power source. A first central link member will generally be interlocked and electrically connected to the upper link member. Additional central link members may be interlocked and electrically connected with the first central link member and other central link members depending on the distance from the power source to the load. A lower link member is linked and electrically connected to the lowest central link member. The lower link member may then be mounted to a load such as a chandelier. The electrical conduit is fully concealed within the housing of the link members, thus allowing the load to be suspended without the presence unsightly wires.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
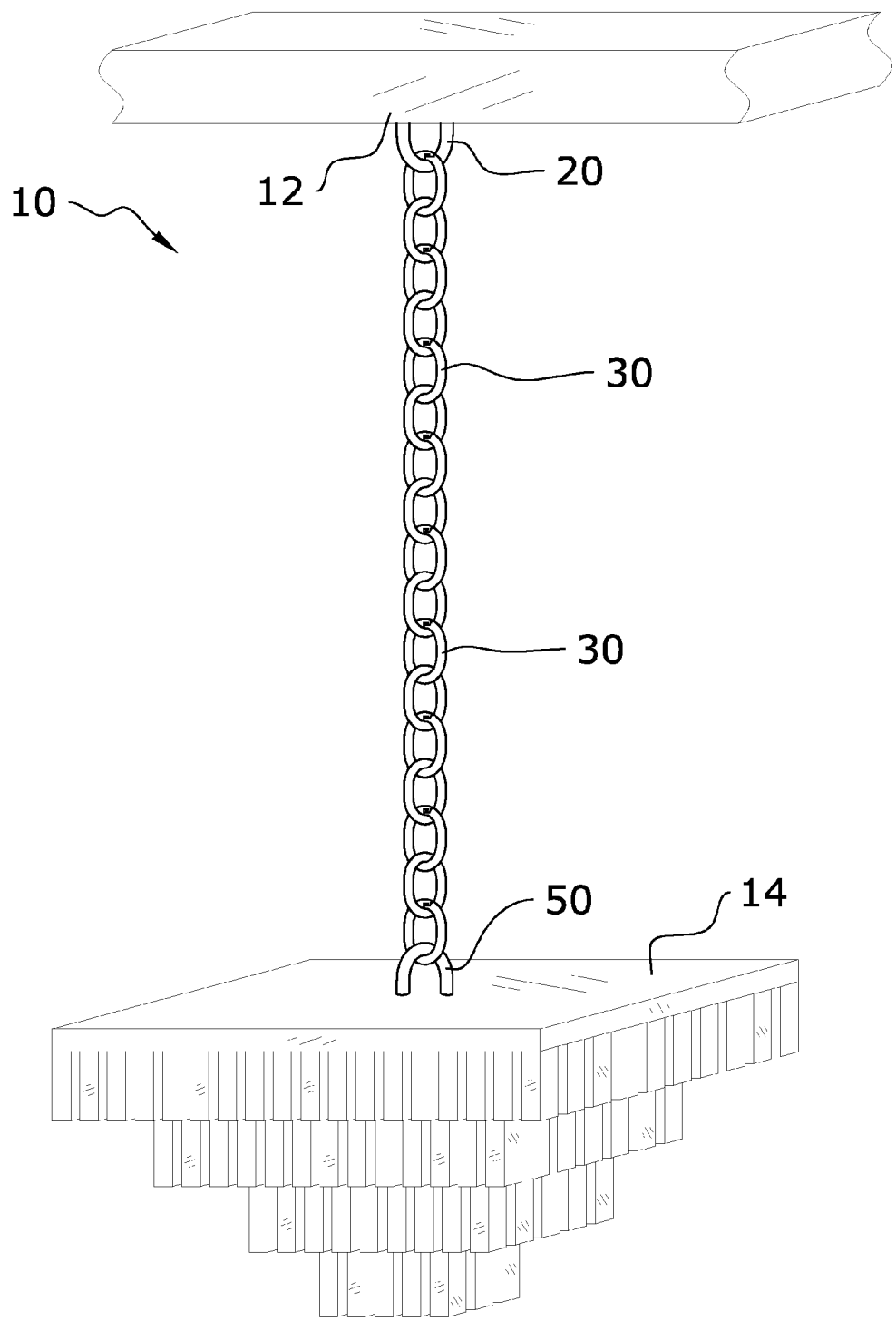
FIG. 1 is an upper perspective view of the present invention.

Turning now descriptively to the drawings, in which similar reference characters denote similar elements throughout the several views, FIGS. 1 through 16 illustrate a conduit link system 10 for concealing conduit linking a power source to a suspended load such as a chandelier. The conduit link system 10 generally includes an upper link member 20 for mounting to a ceiling and electrically connecting to a power source 12. A first central link member 30 will generally be interlocked and electrically connected to the upper link member 20. Additional central link members 30 may be interlocked and electrically connected with the first central link member 30 and other central link members 30 depending on the distance from the power source 12 to the load 14. A lower link member 40 is linked and electrically connected to the lowest central link member 30. The lower link member 40 may then be mounted to a load 14 such as a chandelier. The electrical conduit is fully concealed within the housing of the link members 20, 30, 40, thus allowing the load 12 to be suspended without the presence unsightly wires.

B. Upper Link Member

The present invention will generally include an upper link member 20 for connecting to a power source 12. The upper link member 20 of the present invention may be comprised of various types of materials, including plastics, metals, metal alloys and the like. The upper link member 20 of the present invention will generally be comprised of a housing which includes at least one connection member 22, 23 and at least one conduit 24, 27 extending from the housing.

Figure 8:
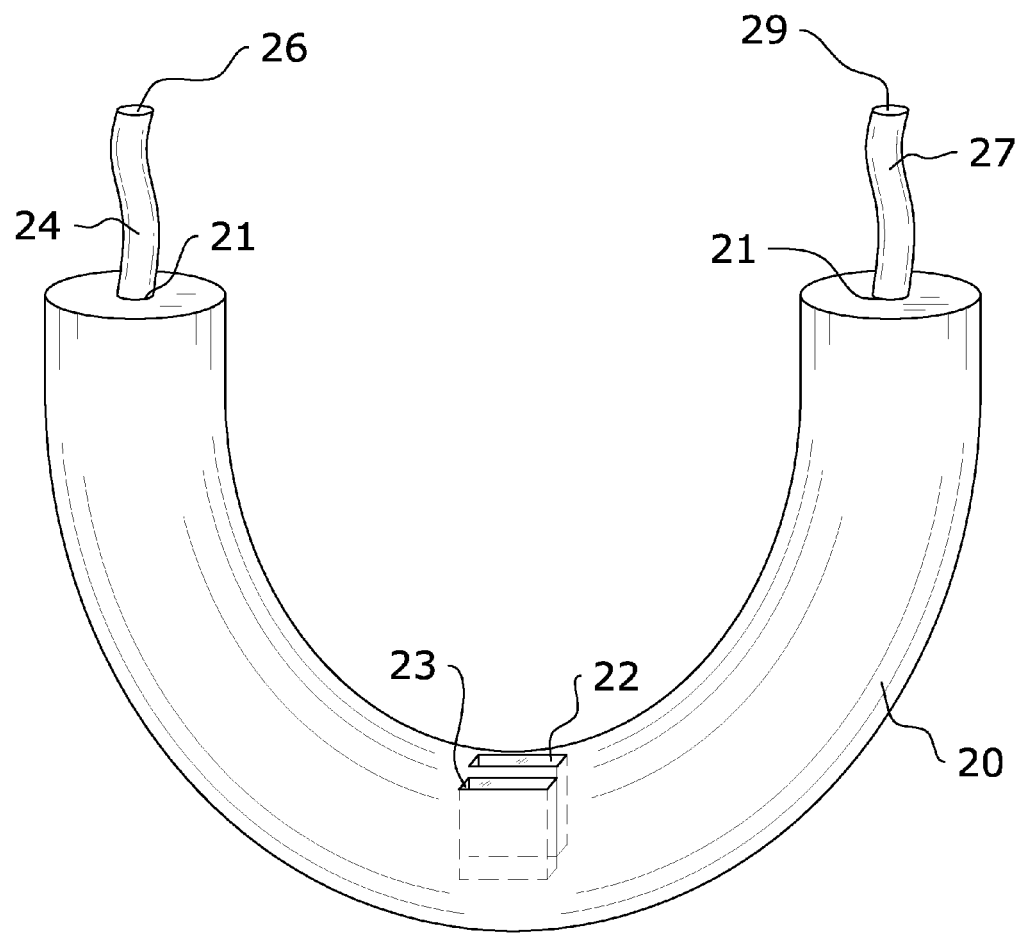
FIG. 8 is an upper perspective view of an upper link member of the present invention.

While the upper link member 20 may be comprised of various shapes and configurations, it will preferably be comprised of a semi-circular configuration as shown in FIG. 8. It is appreciated, however, that other shapes may be utilized, including a semi-rectangular shape or other irregular shapes so long as the upper link member 20 includes at least one connection member 22, 23 for interlocking with a central link member 30 and at least one conduit 26, 27 for connecting to a power source 12.

The upper link member 20 will generally include at least one opening 21 from which at least one conduit 24, 27 will extend for connection to a power source 12. In a preferred embodiment, a first opening 21 will be positioned at a first end of the upper link member 20 and a second opening 21 will be positioned at a second end of the upper link member 20 as shown in FIG. 8. A second end 26 of a first conduit 24 will generally extend from the first opening 21 and a second end 29 of a second conduit 27 will generally extend from the second opening. However, it is appreciated that a single opening 21 may be utilized from which both conduits 24, 27 extend in some embodiments of the present invention.

The upper link member 20 will include at least one female connector 22, 23 for electrically connecting to at least one corresponding male connector 33, 34 on a central link member 30. The at least one female connector 22, 23 of the upper link member 20 will generally be comprised of at least one prong or other structure which acts to conduct and transfer electricity to a corresponding male connector 33, 34. In a preferred embodiment as shown in FIG. 8, the upper link member 20 will include a first female connector 22 and a second female connector 23 which are spaced radially apart on the inner circumference of the upper link member's 20 housing. It is also appreciated that, in some embodiments, male connectors may be utilized on the upper link member 20 to connect with corresponding female connectors on a central link member 30.

Figure 9:
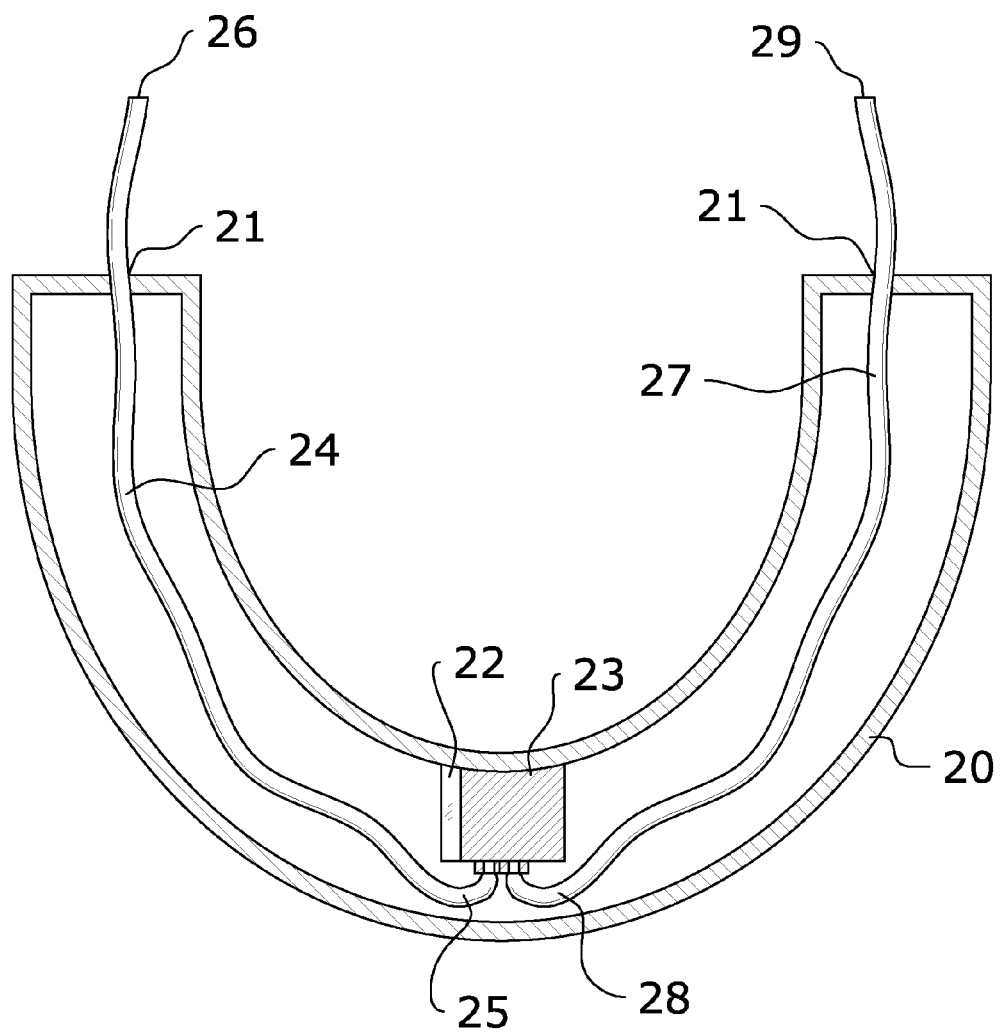
FIG. 9 is a sectional view of an upper link member of the present invention.

The upper link member 20 will also generally include at least one conduit 24, 27 for connecting its at least one female connector 22, 23 to a power source 12. Preferably, as shown in FIG. 9, a first conduit 24 will connect to the first female connector 22 and a second conduit 27 will connect to the second female connector 23. The first conduit 24 will generally be comprised of electrical wiring which acts to conduct power from the power source 12 to the first female connector 22. The first conduit 24 will generally include a first end 25 and a second end 26, wherein the first end 25 of the first conduit 24 is connected to the first female connector 22 and the second end 26 of the first conduit 24 extends out of the housing of the upper link member 20 through an opening 21 for connection to a power supply.

The second conduit 27 will generally be comprised of electrical wiring which acts to conduct power from the power source 12 to the second female connector 23. The second conduit 27 will generally include a first end 28 and a second end 29, wherein the first end 28 of the second conduit 27 is connected to the second female connector 23 and the second end 29 of the second conduit 27 extends out of the housing of the upper link member 20 through an opening 21 for connection to a power supply 12. Preferably, the first conduit 24 will effectuate a positive connection and the second conduit 27 will effectuate a negative connection, though other configurations may be utilized.

The upper link member 20 will generally be mounted, welded or otherwise fixedly attached to a ceiling or other structure from which the conduit link system 10 will be suspended. The conduits 24, 27 will generally connect to a source of power 12 within the ceiling or other structure and electricity will be transferred to the at least one connector 22, 23 to be transferred to other link members 30, 40 and eventually, to a load 14.

C. Central Link Member

The present invention will generally utilize one or more central link members 30 for electrically connecting the upper link member 20 with the lower link member 40 of the present invention. The central link member 30 of the present invention will generally be utilized to connect with an upper link member 20, another central link member 30 or a lower link member 40 of the present invention. Any number of central link members 30 may be utilized depending on the distance from the power source 12 to the load 14.

The central link member 30 of the present invention may be comprised of various types of materials, including plastics, metals, metal alloys and the like. The central link member 30 of the present invention will generally be comprised of a housing which includes one or more male connectors 33, 34, one or more female connectors 37, 38 and at least one conduit 40, 44 connecting the male connectors 33, 34 to the female connectors 37, 38.

Figure 2:
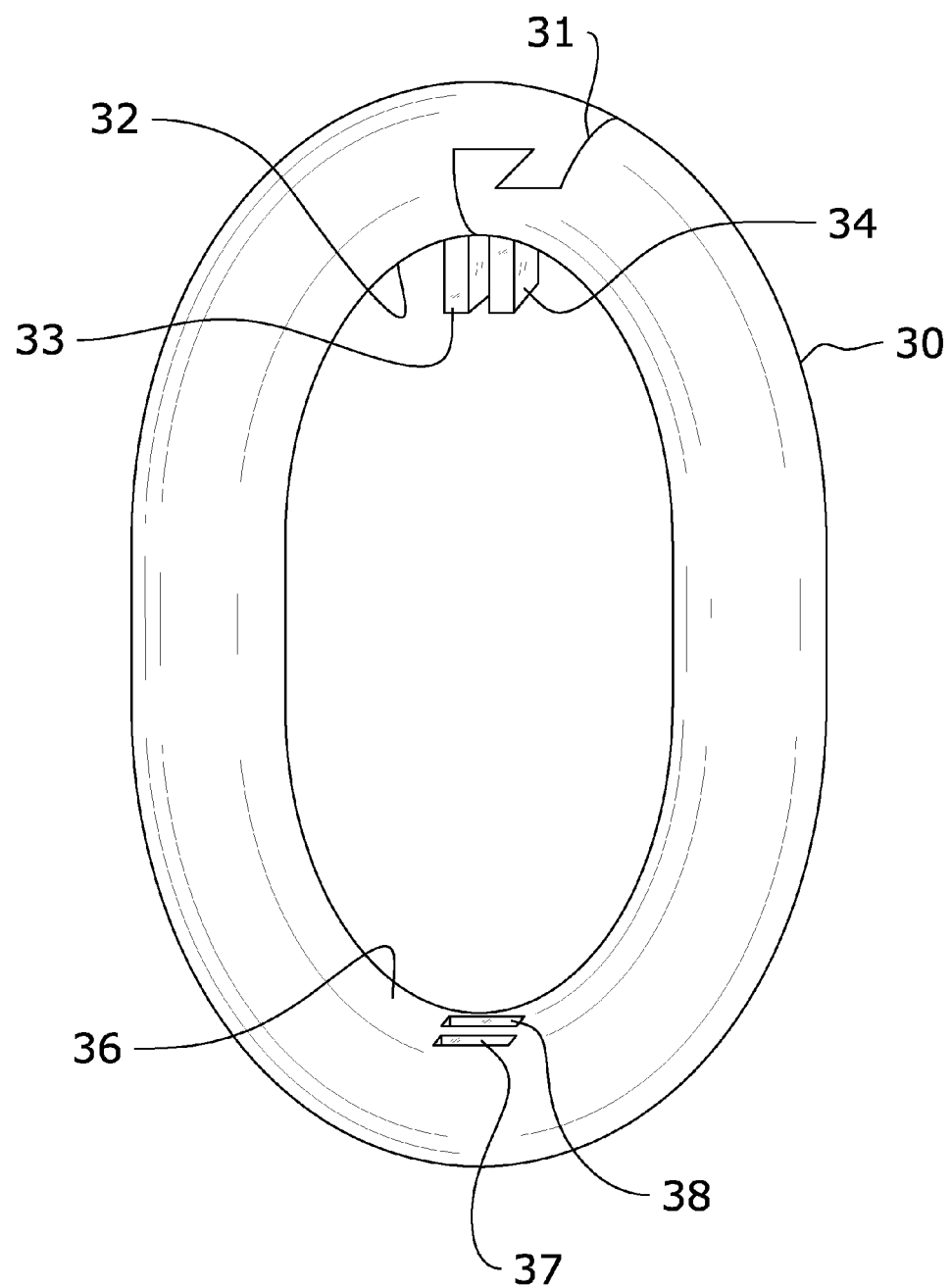
FIG. 2 is an upper perspective view of a central link member of the present invention.

While the central link member 20 may be comprised of various shapes and configurations, it will preferably be comprised of a circular configuration as shown in FIG. 2. It is appreciated, however, that other shapes may be utilized, including a rectangular or square shape or other irregular shapes. In a preferred embodiment as shown in FIG. 2, the central link member 20 will include an upper inner portion 32 and a lower inner portion 36.

Figure 3:
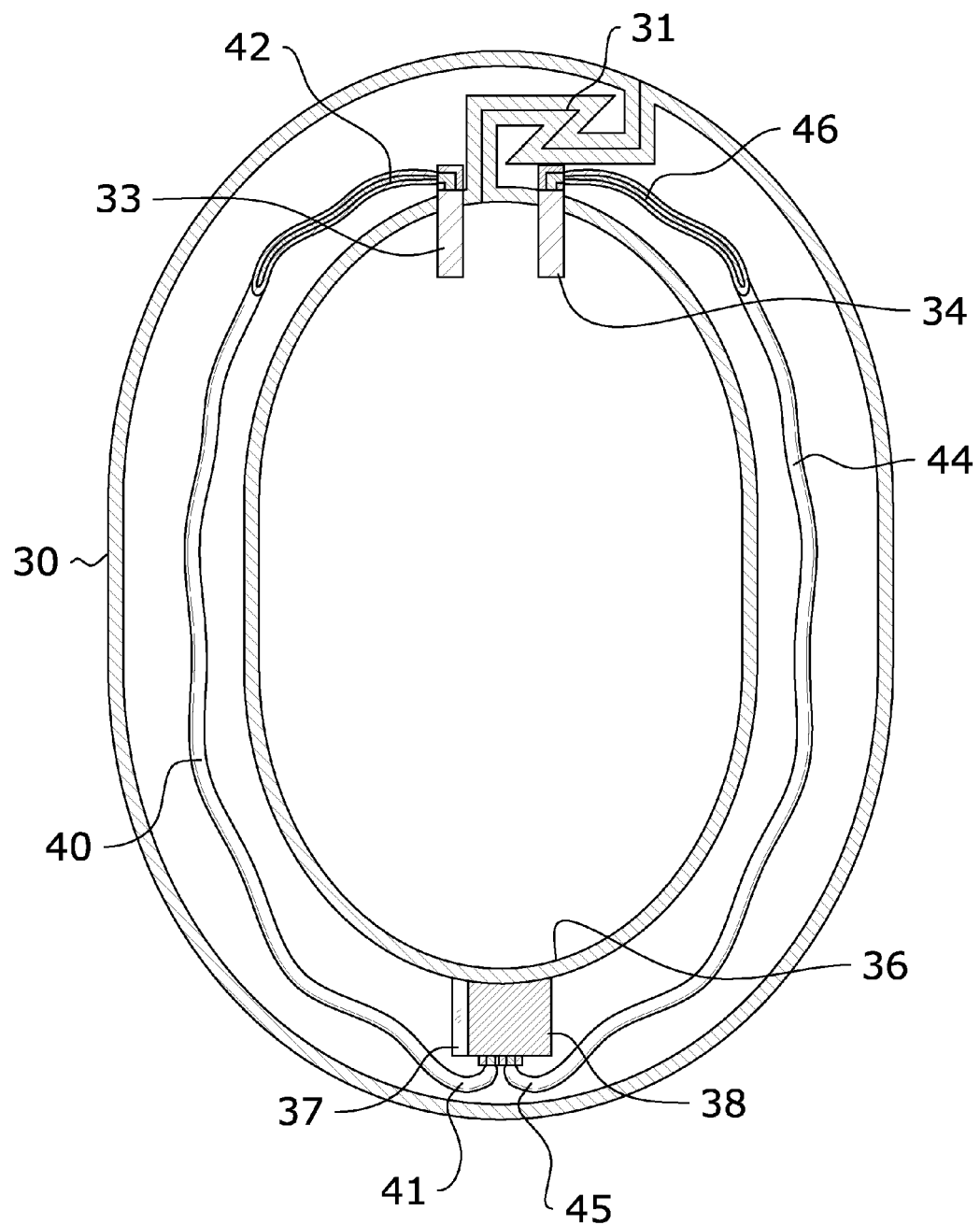
FIG. 3 is a sectional view of a central link member of the present invention.
Figure 4:
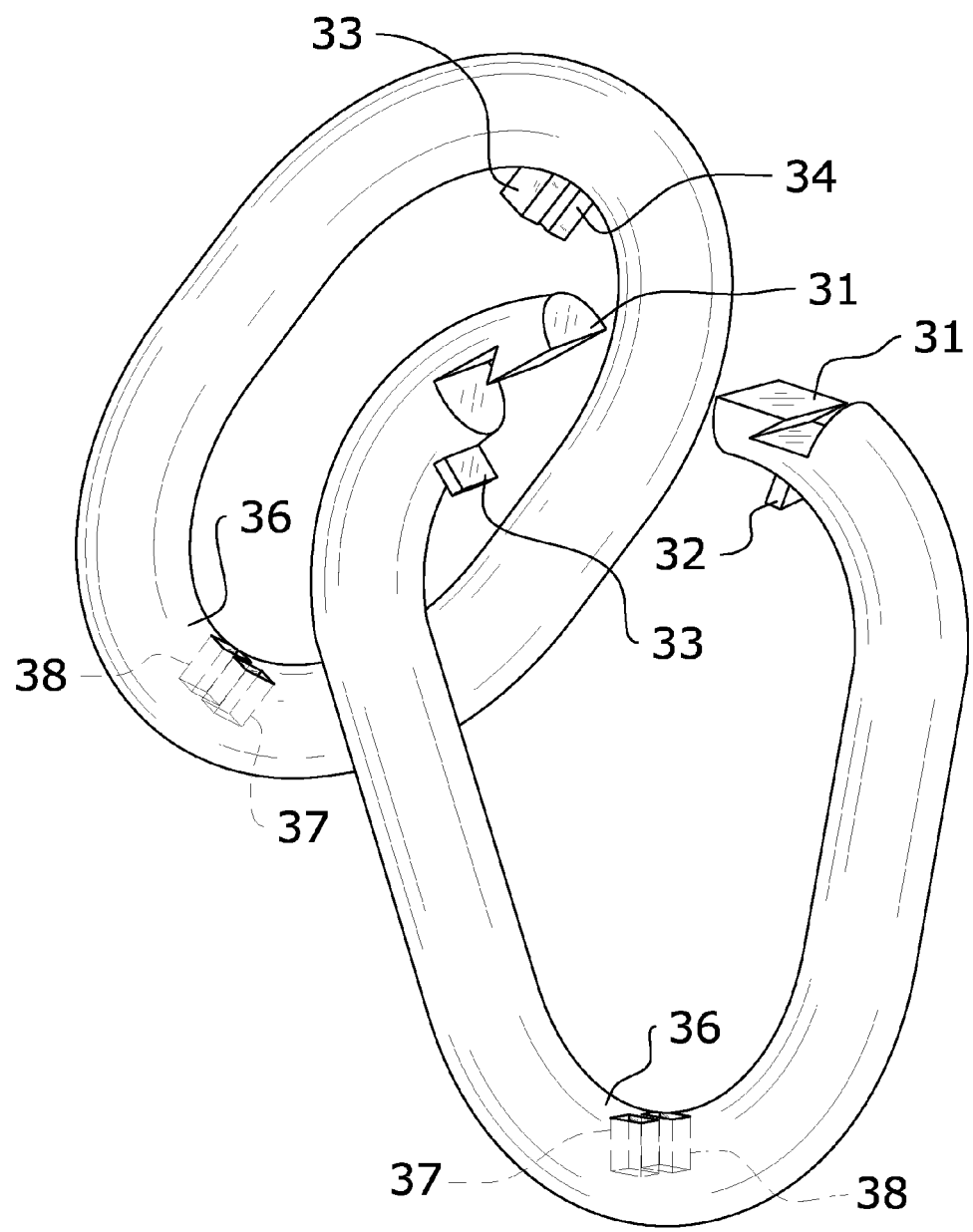
FIG. 4 is an upper perspective view illustrating the interconnection of a pair of central link members.
Figure 5:
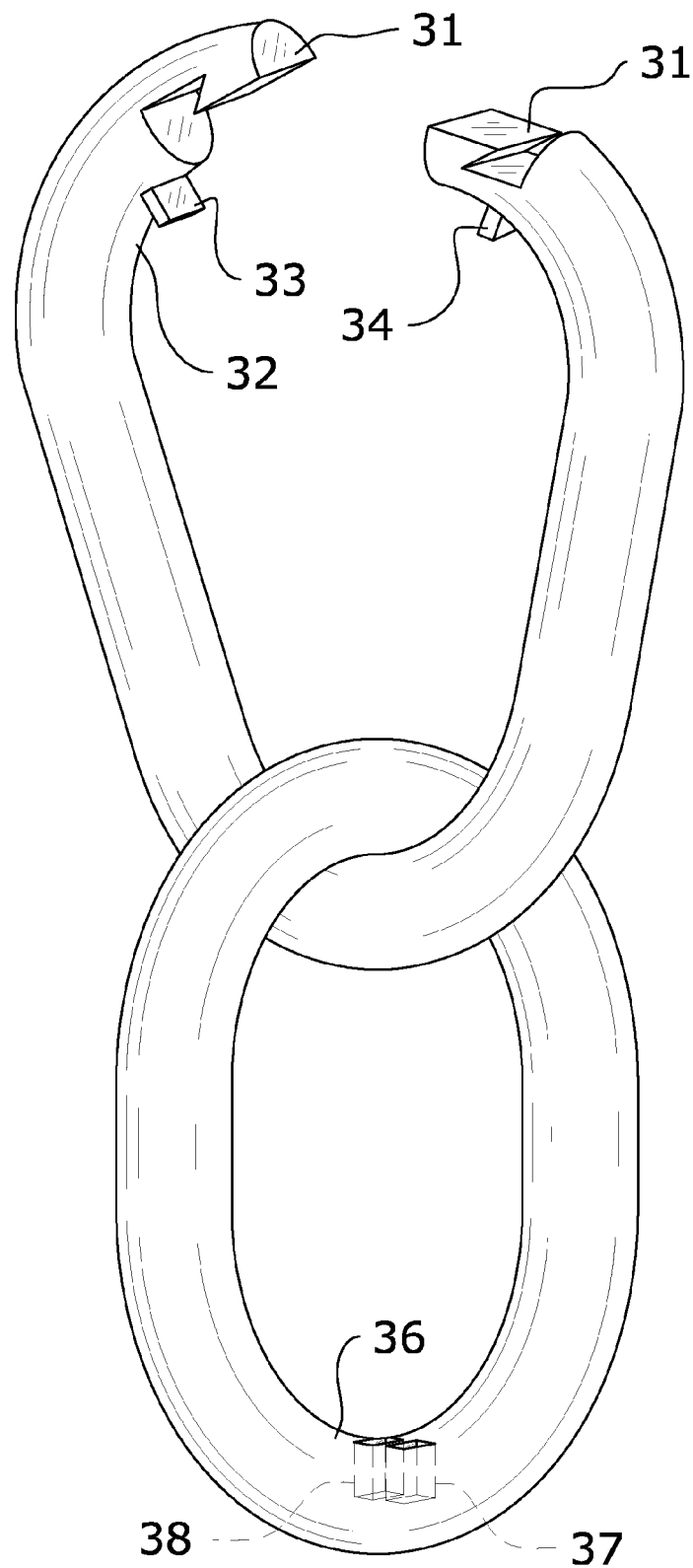
FIG. 5 is an upper perspective view illustrating the interconnection of a pair of central link members.

A pair of male connectors 33, 34 will preferably be positioned on the upper inner portion 32 of the central link member 20 and a pair of female connectors 37, 38 will preferably be positioned on the lower inner portion 36 of the central link member 20 as shown in FIG. 3. A pair of conduits 40, 44 will generally connect the male connectors 33, 34 with the female connectors 37, 38. A first end 41 of a first conduit 40 will generally be electrically connected to the first male connector 33 and a second end 42 of the first conduit 40 will generally be electrically connected to the first female connector 37. Similarly, a first end 45 of a second conduit 44 will generally be electrically connected to the second male connector 34 and a second end 46 of the second conduit 44 will generally be electrically connected to the second female connector 38. While various configurations may be utilized, the first conduit 40 will generally be comprised of a positive connection and the second conduit 44 will generally be comprised of a negative connection.

Figure 7:
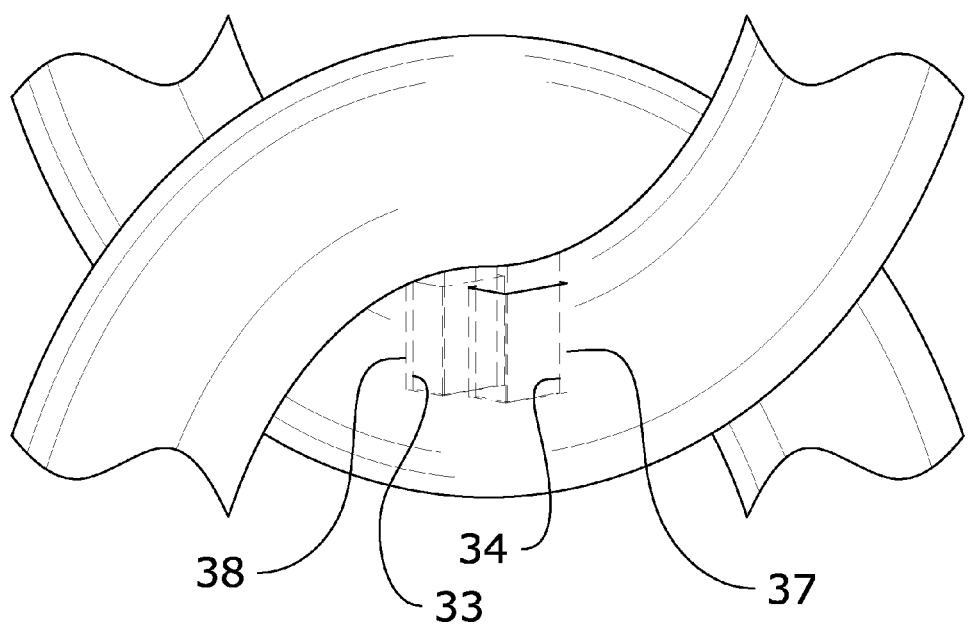
FIG. 7 is an internal view illustrating the interconnection of the male connectors and female connectors of a pair of central link members.

While various configurations may be utilized, the male connectors 33, 34 will generally be comprised of a pair of prongs which are adapted to configure with the female connectors 37, 38, which will generally be comprised of a pair of slots for removably receiving the prongs as shown in FIG. 3. The male connectors 33, 34 will generally be oriented in a perpendicular direction with respect to the female connectors 37, 38 so that interlocked link members 30 may be oriented at right angles with respect to each other. When two central link members 30 are interconnected as shown in FIG. 7, the male connectors 33, 34 will be inserted within the female connectors 37, 38 to effectuate an electrical connection. However, it should be appreciated that various other configurations may be utilized. For example, a single male connector and a single female connector may be utilized in some embodiments.

Figure 6:
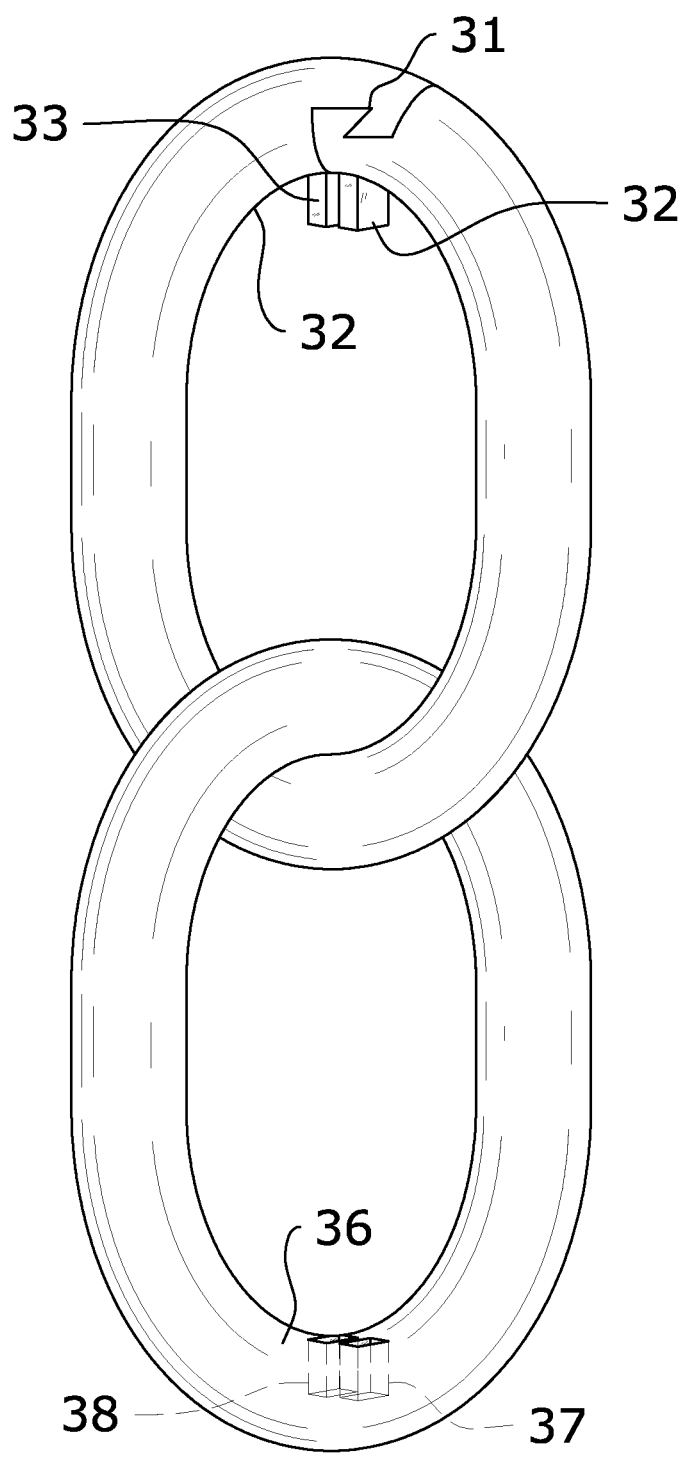
FIG. 6 is an upper perspective view illustrating the interconnection of a pair of central link members.

The central link member 30 will also generally include a snap member 31 which allows the central link member 30 to be opened and closed for interlocking as shown in FIGS. 6 and 7. The snap member 31 may be comprised of any structure which allows two halves of an object to be removably attached to each other and should not be construed as being limited to the structure shown in the figures.

D. Lower Link Member

The present invention will generally include a lower link member 50 for connecting to a load 14. The lower link member 50 of the present invention may be comprised of various types of materials, including plastics, metals, metal alloys and the like. The lower link member 30 of the present invention will generally be comprised of a housing which includes at least one connection member 52, 53 and at least one conduit 54, 57 extending from the housing.

Figure 10:
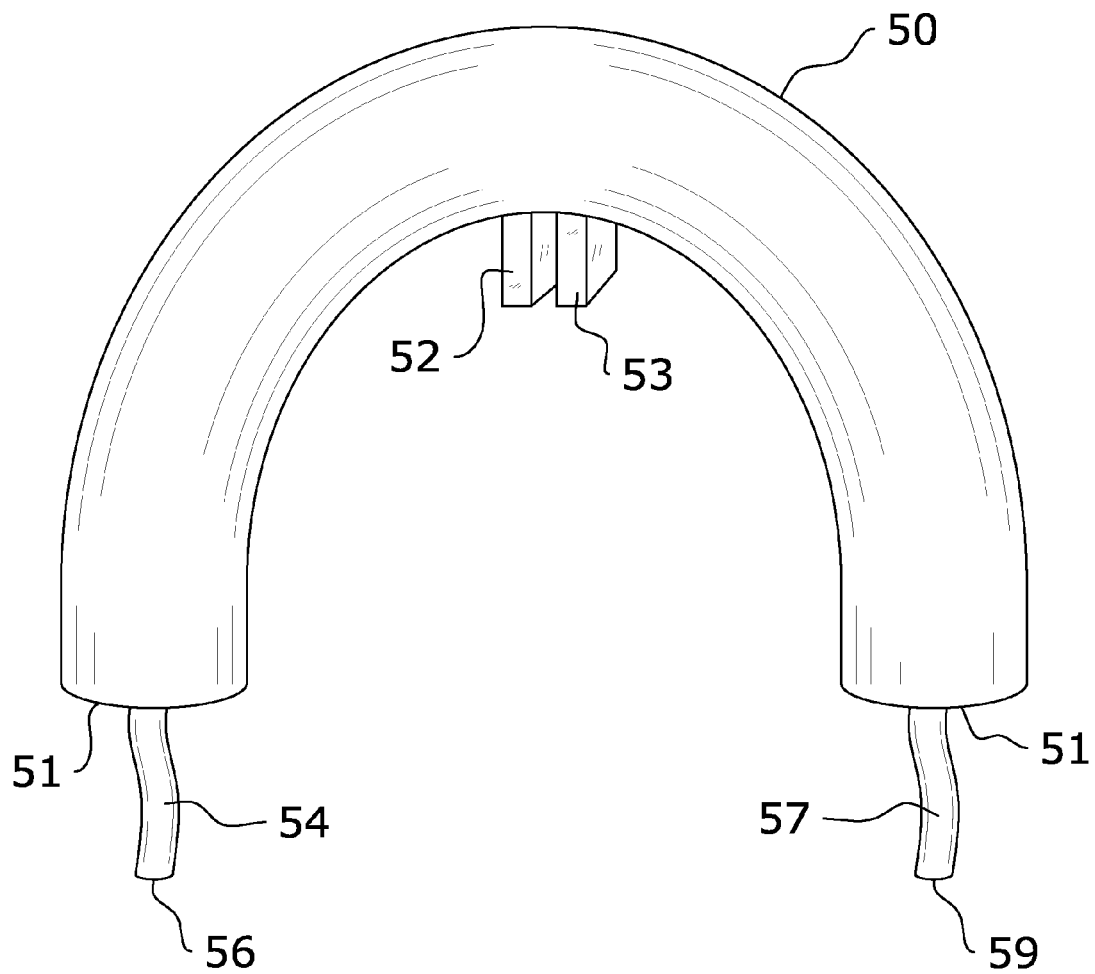
FIG. 10 is an upper perspective view of a lower link member of the present invention.

While the lower link member 50 may be comprised of various shapes and configurations, it will preferably be comprised of a semi-circular configuration as shown in FIG. 10. It is appreciated, however, that other shapes may be utilized, including a semi-rectangular shape or other irregular shapes so long as the lower link member 50 includes at least one connection member 52, 53 for interlocking with a central link member 30 and at least one conduit 54, 57 for connecting to a load 14.

The lower link member 50 will generally include at least one opening 51 from which at least one conduit 54, 57 will extend for connection to a load 14. In a preferred embodiment, a first opening 51 will be positioned at a first end of the lower link member 50 and a second opening 51 will be positioned at a second end of the lower link member 50 as shown in FIG. 8. A second end 56 of a first conduit 54 will generally extend from the first opening 51 and a second end 59 of a second conduit 57 will generally extend from the second opening 51. However, it is appreciated that a single opening 51 may be utilized from which both conduits 54, 57 extend in some embodiments of the present invention.

The lower link member 50 will include at least one male connector 52, 53 for electrically connecting to at least one corresponding female connector 37, 38 on a central link member 30. The at least one male connector 52, 53 of the lower link member 50 will generally be comprised of at least one prong or other structure which acts to conduct and transfer electricity to a corresponding female connector 37, 38.

In a preferred embodiment as shown in FIG. 10, the lower link member 50 will include a first male connector 52 and a second male connector 53 which are spaced radially apart on the inner circumference of the lower link member's 50 housing. It is also appreciated that, in some embodiments, female connectors may be utilized on the lower link member 50 to connect with corresponding male connectors on a central link member 30.

Figure 11:
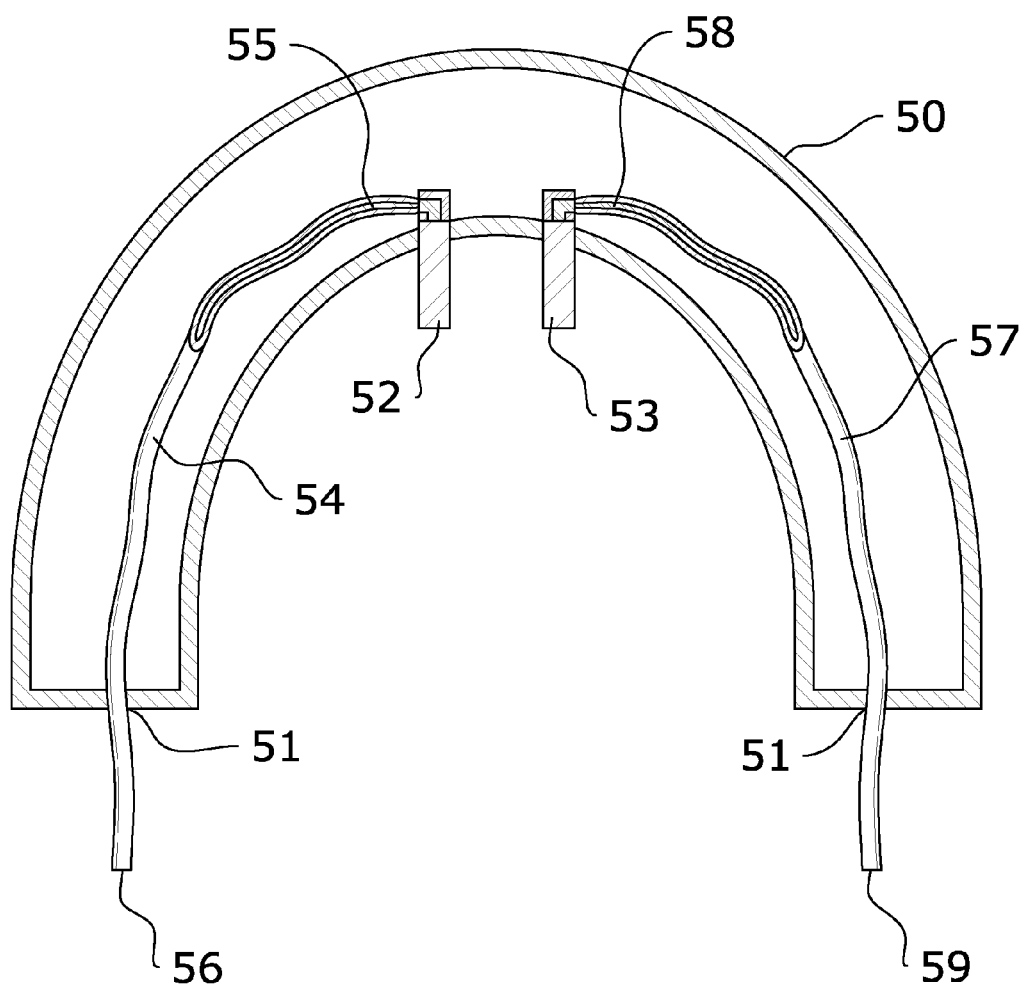
FIG. 11 is a sectional view of a lower link member of the present invention.

The lower link member 50 will also generally include at least one conduit 54, 57 for connecting it's at least one male connector 52, 53 to a load 14. Preferably, as shown in FIG. 11, a first conduit 54 will connect to the first male connector 52 and a second conduit 57 will connect to the second male connector 53. The first conduit 54 will generally be comprised of electrical wiring which acts to transfer power to the load 14 from the first male connector 52. The first conduit 54 will generally include a first end 55 and a second end 56, wherein the first end 55 of the first conduit 54 is connected to the first male connector 52 and the second end 56 of the first conduit 54 extends out of the housing of the lower link member 50 through an opening 51 for connection to a load 14.

The second conduit 57 will generally be comprised of electrical wiring which acts to conduct power to the load 14 from the second male connector 53. The second conduit 57 will generally include a first end 58 and a second end 59, wherein the first end 58 of the second conduit 57 is connected to the second male connector 53 and the second end 59 of the second conduit 57 extends out of the housing of the lower link member 50 through an opening 51 for connection to a load 14. Preferably, the first conduit 54 will effectuate a positive connection and the second conduit 57 will effectuate a negative connection, though other configurations may be utilized.

The lower link member 50 will generally be mounted, welded or otherwise fixedly attached to a load 14 such as a chandelier which the conduit link system 10 will be suspending. The conduits 54, 57 will generally connect to the load 14 and electricity will be transferred from the at least one connector 52, 53 to be transferred to the load 14.

E. Split Link Member

Figure 12:
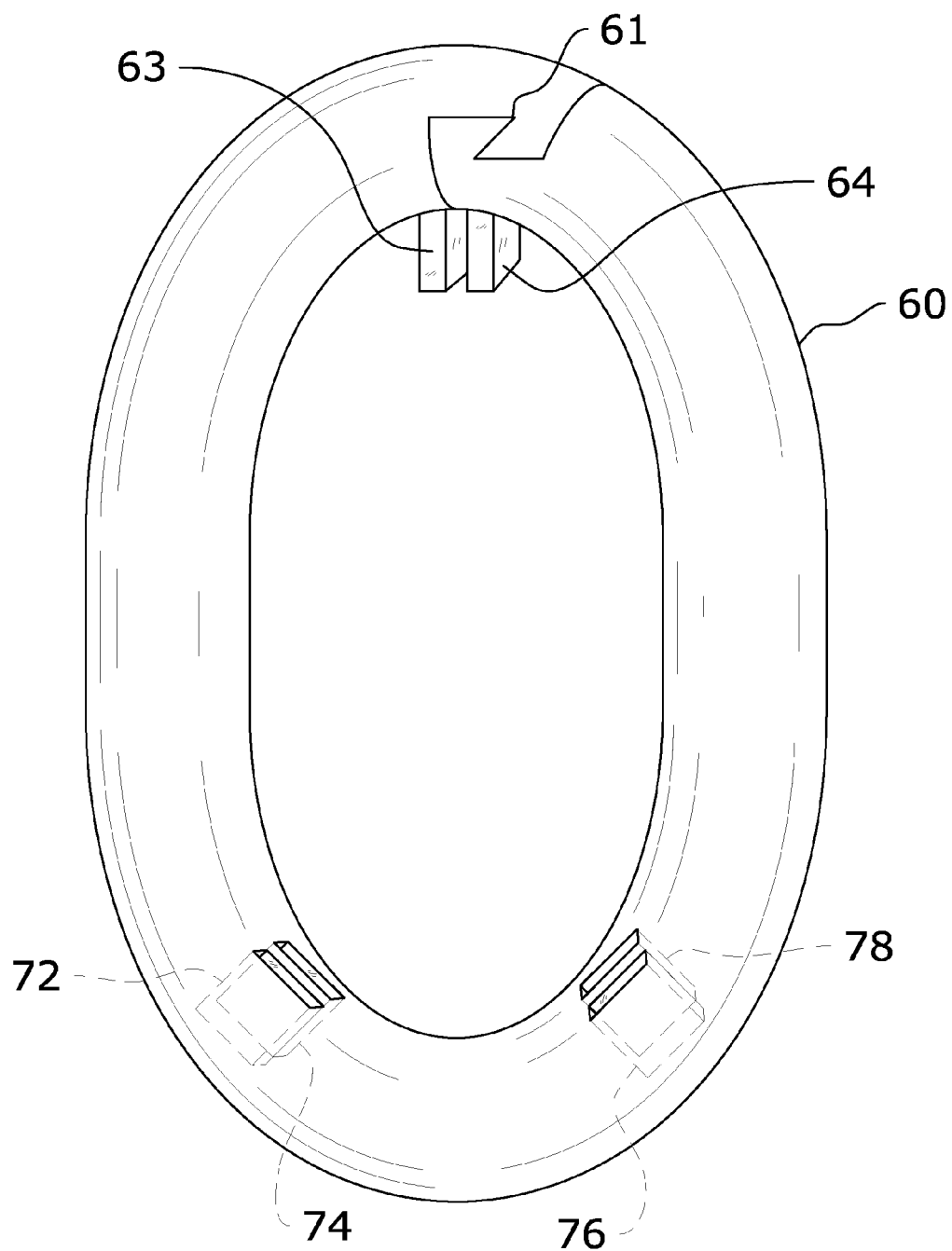
FIG. 12 is an upper perspective view of a split link member of the present invention.

In instances in which a pair of loads 14 such as lamps is to be suspended from a single power source 12, a split link member 60 may be utilized with the present invention. As shown in FIG. 12, the split link member 60 will generally be comprised of a housing which includes at least one male connector 63, 64 on its upper inner portion 62 and at least two female connectors 72, 74, 76, 78 on its lower inner portion 70. The split link member 60 of the present invention may be comprised of various types of materials, including plastics, metals, metal alloys and the like While the split link member 60 may be comprised of various shapes and configurations, it will preferably be comprised of a circular configuration as shown in FIG. 12. It is appreciated, however, that other shapes may be utilized, including a rectangular shape or other irregular shapes.

The split link member 60 will also generally include a snap member 61 which allows the split link member 60 to be opened and closed for interlocking as shown in FIG. 12. The snap member 61 may be comprised of any structure which allows two halves of an object to be removably attached to each other and should not be construed as being limited to the structure shown in the figures.

The split link member 60 of the present invention will generally include a first male connector 63 and a second male connector 64 positioned on its upper inner portion 62 for allowing the split link member 60 to be interlinked and electrically connected to a central link member 30. The first male connector 63 and second male connector 64 of the split link member 60 will generally interlock with a corresponding set of female connectors 37, 38 on the lower inner portion 36 of a central link member 30 as shown. However, it is appreciated that the present invention should not be construed to this particular configuration. For example, a single connector may be utilized on the upper inner portion 62 of the split link member 60 in certain embodiments. Additionally, female connectors may be utilized in the place of the male connectors 63, 64.

The split link member 60 will generally include a first female connector 72, second female connector 74, third female connector 76 and fourth female connector 78 positioned on its lower inner portion 70. The first and second female connectors 72, 74 will generally be positioned a radial distance away from the third and fourth female connectors 76, 78.

Figure 13:
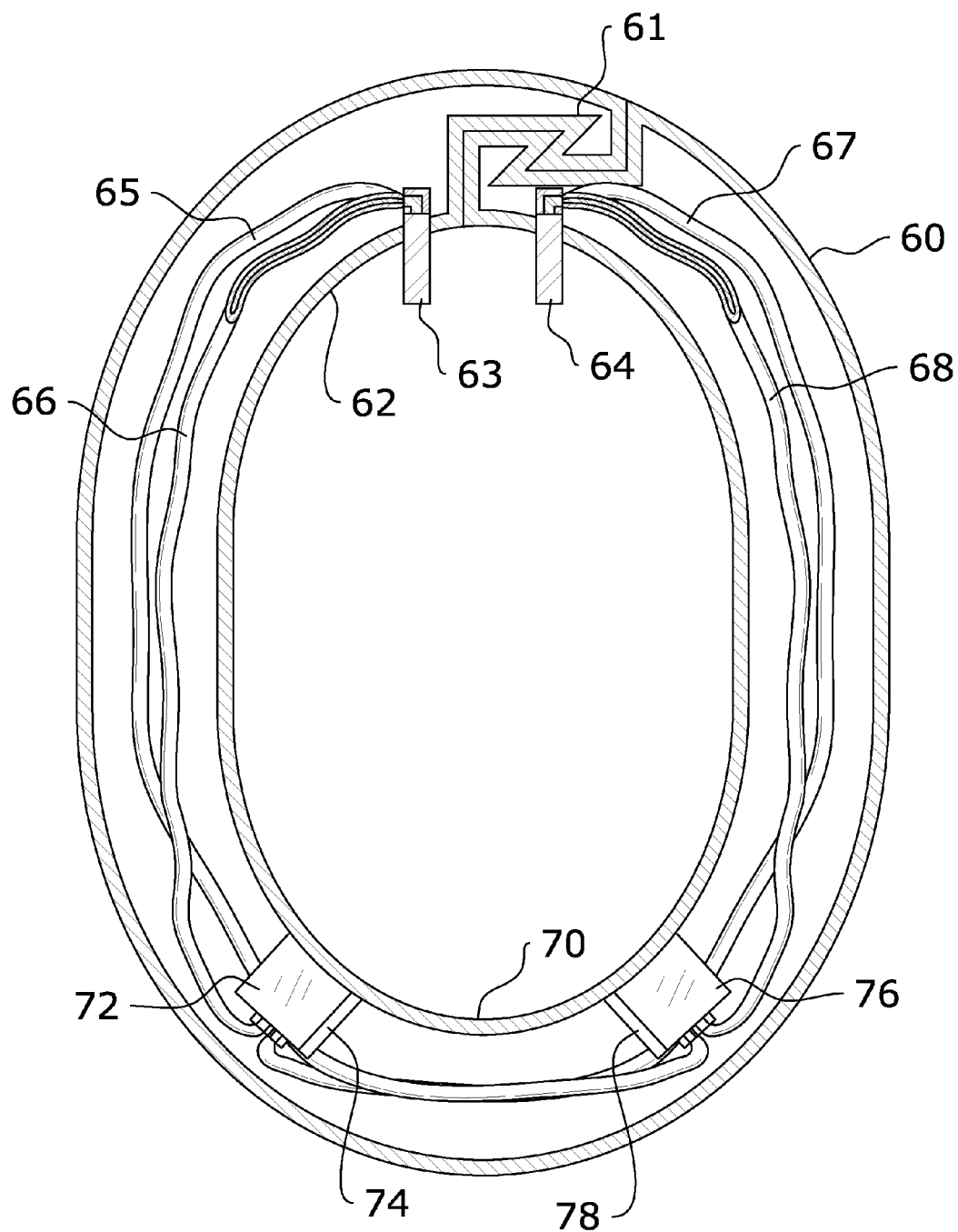
FIG. 13 is a sectional view of a split link member of the present invention.

The interior of a split link member 60 is illustrated in FIG. 13. A first conduit 65 will generally connect the first male connector 63 to the first female connector 72. A second conduit 66 will generally connect the first male connector 63 to the second female connector 76. A third conduit 67 will generally connect the second male connector 64 to the first female connector 72 and a fourth conduit 68 will generally connect the second male connector 64 to the second female connector 76.

Figure 14:
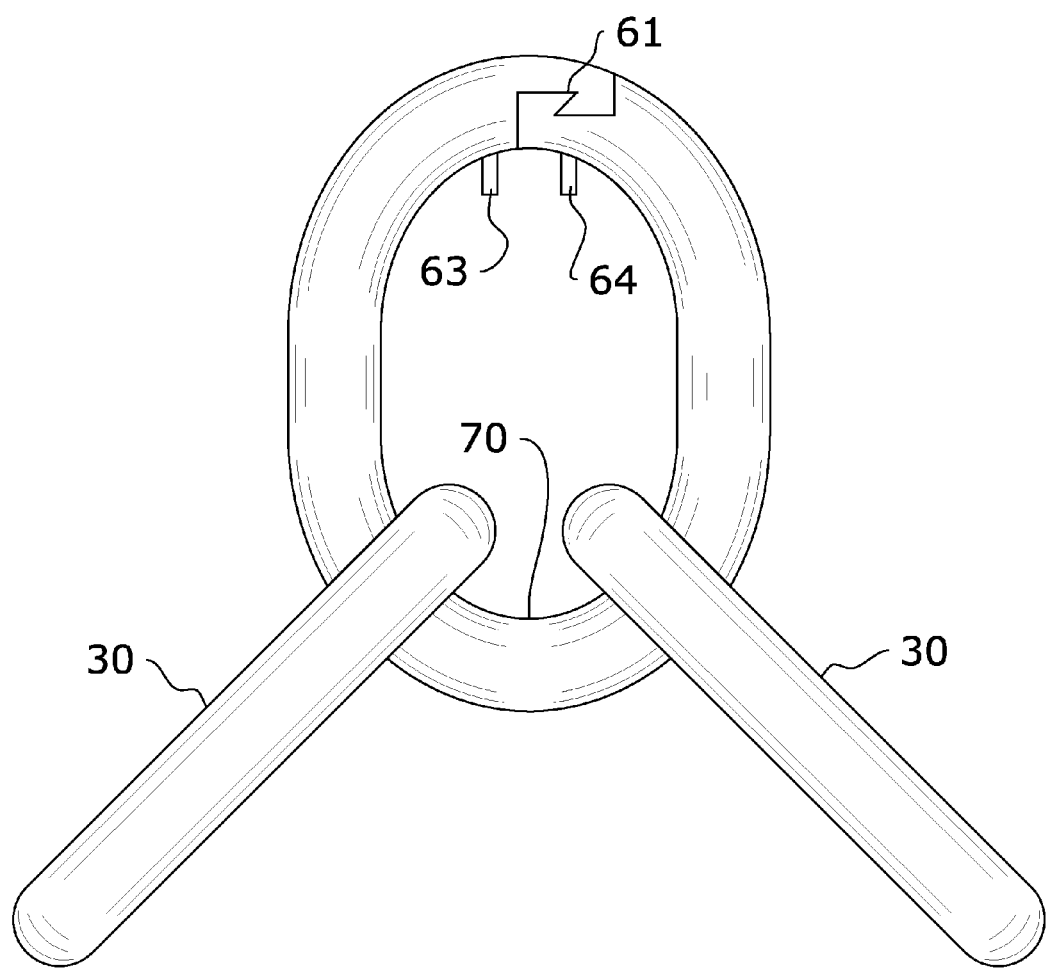
FIG. 14 is an upper perspective view illustrating the interconnection of a split link member with a pair of central link members of the present invention.

As shown in FIG. 14, the first and second female connectors 72, 74 will be utilized to electrically connect to a first central link member 30 and the third and fourth female connectors 76, 78 will be utilized to electrically connect to a second central link member 30. With such a configuration, a single chain may be split into two for accommodating a pair of loads 14 suspended from a single power source 12.

F. Operation of Preferred Embodiment

In use, the upper link member 20 is first mounted to a surface such as a ceiling from which the load 14 will be suspended. The first and second conduits 24, 27 of the upper link member 20 will then be electrically connected with a power source 12, generally comprised of electrical leads within the ceiling. A central link member 30 may then be interlocked with and electrically connected to the upper link member 20 by inserting the first and second male connectors 33, 34 of the central link member 30 into the first and second female connectors 22, 23 of the upper link member 20.

A lower link member 50 may then be interlocked with and electrically connected to the central link member 30 by inserted the first and second male connectors 52, 53 of the lower link member 50 into the first and second female connectors 37, 38 of the central link member 30. The load 14, such as a chandelier or lamp, may then be suspended from the lower link member 50 and electrically connected thereto by connecting the first and second conduits 54, 57 of the lower link member 50 with the load 14.

If needed, additional central link members 30 may be utilized to extend the length of the system as a whole. Additionally, split link members 60 may be utilized to split the chain into multiple pathways to accommodate a plurality of loads 14.

G. Alternate Embodiments

It is appreciated that various alternate embodiments may be utilized with the present invention, and the present invention should not be construed as being limited to transferring power. Various types of conduits 40, 44 may be utilized to transfer various other commodities. For example, the conduits 40, 44 utilized with the present invention may be configured to transfer telecommunications signals, sound signals and/or video signals (i.e. where the load 14 is comprised of a projector). Further, the conduits 40, 44 may alternatively be utilized to transfer lighting (i.e. light pipes), fiber optics or any other commodity or substance capable of being transferred via conduit connections. Accordingly, the present invention should not be construed as being limited by the exemplary embodiments presently shown herein related to chandelier applications. The present invention is suited for use in combination with a wide range of conduits and applications.

Figure 15:
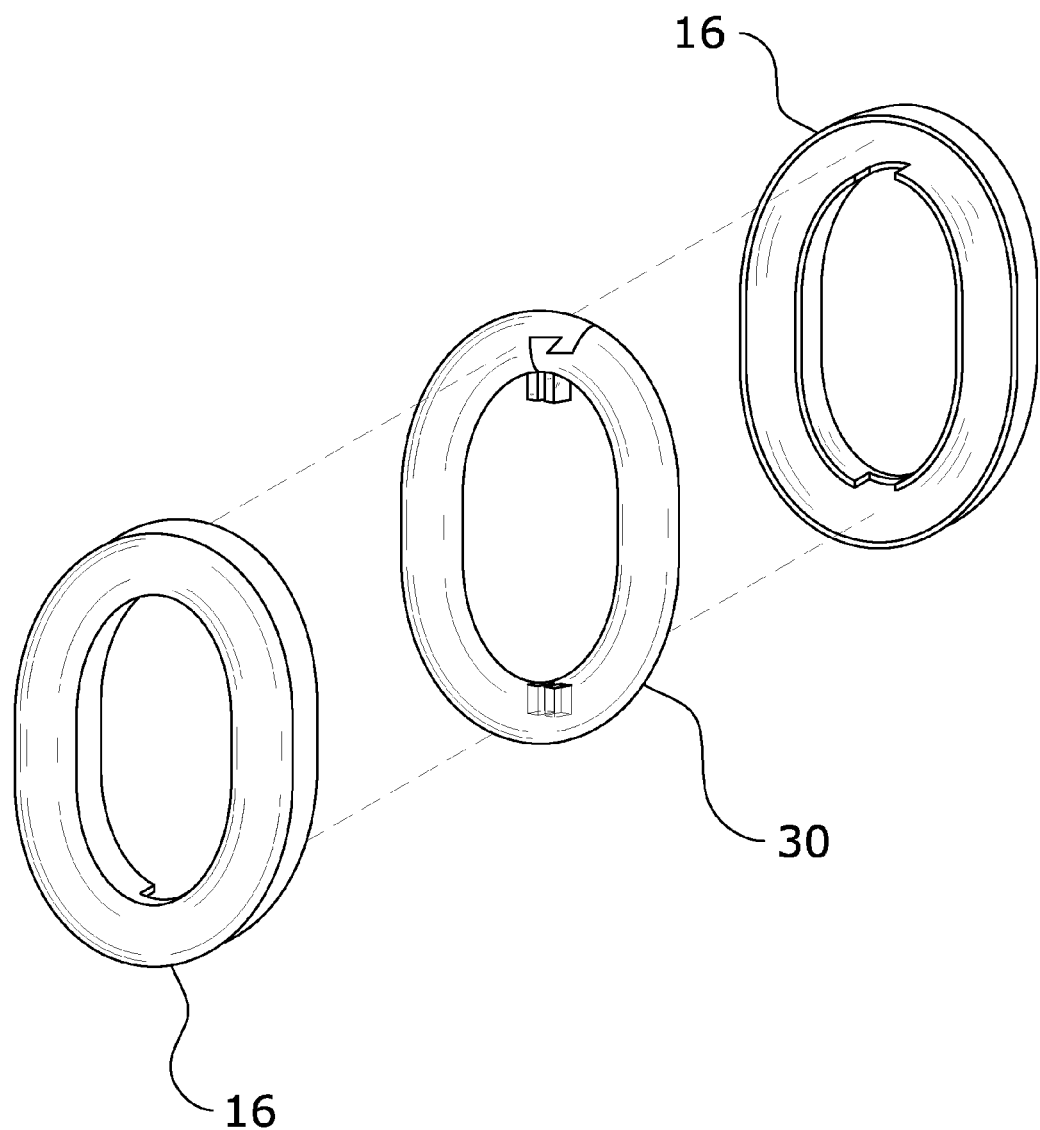
FIG. 15 is an upper perspective view illustrating the positioning of a cover member around a link.
Figure 16:
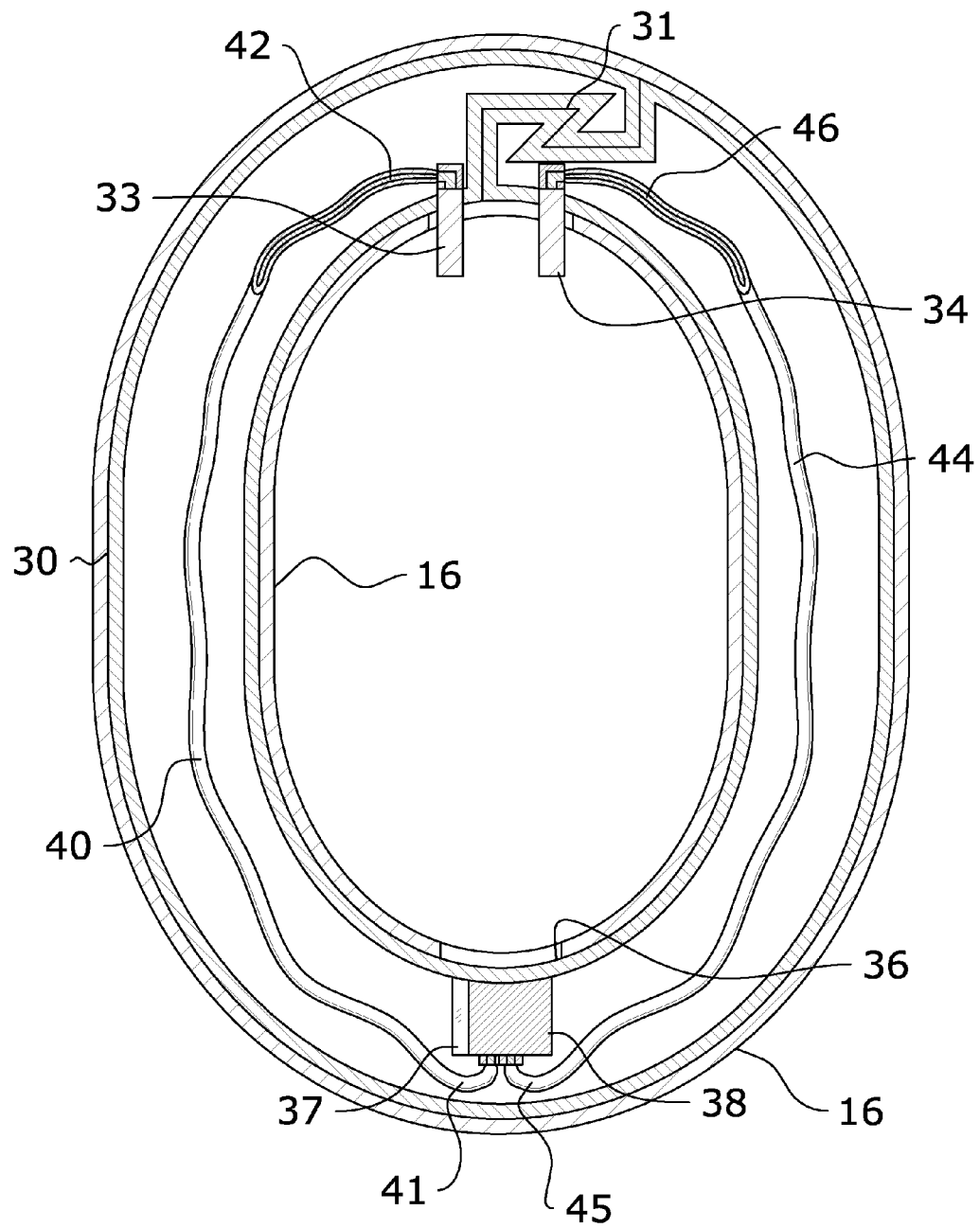
FIG. 16 is a sectional view of a link member surrounded by a cover member.

It is also appreciated that, in some embodiments, a cover member 16 may be utilized to enclose each of the links of the present invention. As shown in FIGS. 15 and 16, one example of such a cover member 16 is comprised of two interlocking halves which act to completely encapsulate a link. Slots are provided on the inner circumference of each cover member 16 to accommodate the male connectors 33, 34. The cover members 16 may be utilized for waterproofing for outdoor installations or for decorative purposes. It is appreciated that the cover members 16 should not be construed as being limited to the structure shown in the figures, and various other types of cover members 16 may be utilized with the present invention.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A conduit link system, comprising:
   at least one central link member comprised of a housing having at least one first connector of a first type and at least one second connector of a second type, wherein said at least one first connector is electrically connected to said at least one second connector, wherein said at least one first connector of a first type of said central link member is comprised of a first male connector and a second male connector positioned radially apart from each other on an upper inner portion of said central link member; and
   an upper link member comprised of a housing having at least one first connector of a second type and at least one conduit extending from said housing, wherein said at least one conduit is adapted to be electrically connected to a power source; and
   a lower link member comprised of a housing having at least one first connector of a first type and at least one conduit extending from said housing, wherein said at least one conduit is adapted to be electrically connected to a load;
   wherein said upper link member is suspended from a surface, wherein said central link member is electrically connected and interlocked with said upper link member, wherein said lower link member is electrically connected and interlocked with said central link member, wherein a load is electrically connected to and suspended from said lower link member.

2. The conduit link system of claim 1, wherein said at least one second connector of a second type is comprised of a first female connector and a second female connector positioned radially apart from each other on a lower inner portion of said central link member.

3. The conduit link system of claim 2, wherein said at least one first connector of a second type of said upper link member is comprised of a first female connector and a second female connector positioned radially apart from each other.

4. The conduit link system of claim 3, wherein said at least one first connector of a first type of said lower link member is comprised of a first male connector and a second male connector positioned radially apart from each other.

5. The conduit link system of claim 1, wherein said at least one central link member is comprised of a first central link member and a second central link member, wherein said first central link member is interlocked at one end with said upper link member and at another end with said second central link member, wherein said lower link member is interlocked with said second central link member.

6. The conduit link system of claim 1, wherein said load is comprised of a chandelier.

7. The conduit link system of claim 2, wherein said central link member includes a first conduit and a second conduit concealed within said central link member, wherein said first conduit connects said first male connector of said central link member with said first female connector of said central link member and wherein said second conduit connects said second male connector of said central link member with said second female connector of said central link member.

8. The conduit link system of claim 3, wherein said at least one conduit of said upper link member is comprised of a first conduit and a second conduit, wherein a first end of said first conduit is connected to said first female connector and a second end of said first conduit extends out of said upper link member for connection to a power source, wherein a first end of said second conduit is connected to said second female connector and a second end of said second conduit is extends out of said upper link member for connection to a power source.

9. The conduit link system of claim 4, wherein said at least one conduit of said lower link member is comprised of a first conduit and a second conduit, wherein a first end of said first conduit is connected to said first male connector and a second end of said first conduit extends out of said lower link member for connection to a load, wherein a first end of said second conduit is connected to said second male connector and a second end of said second conduit extends out of said lower link member for connection to a load.

\* \* \* \* \*